UNITED STATES PATENT OFFICE.

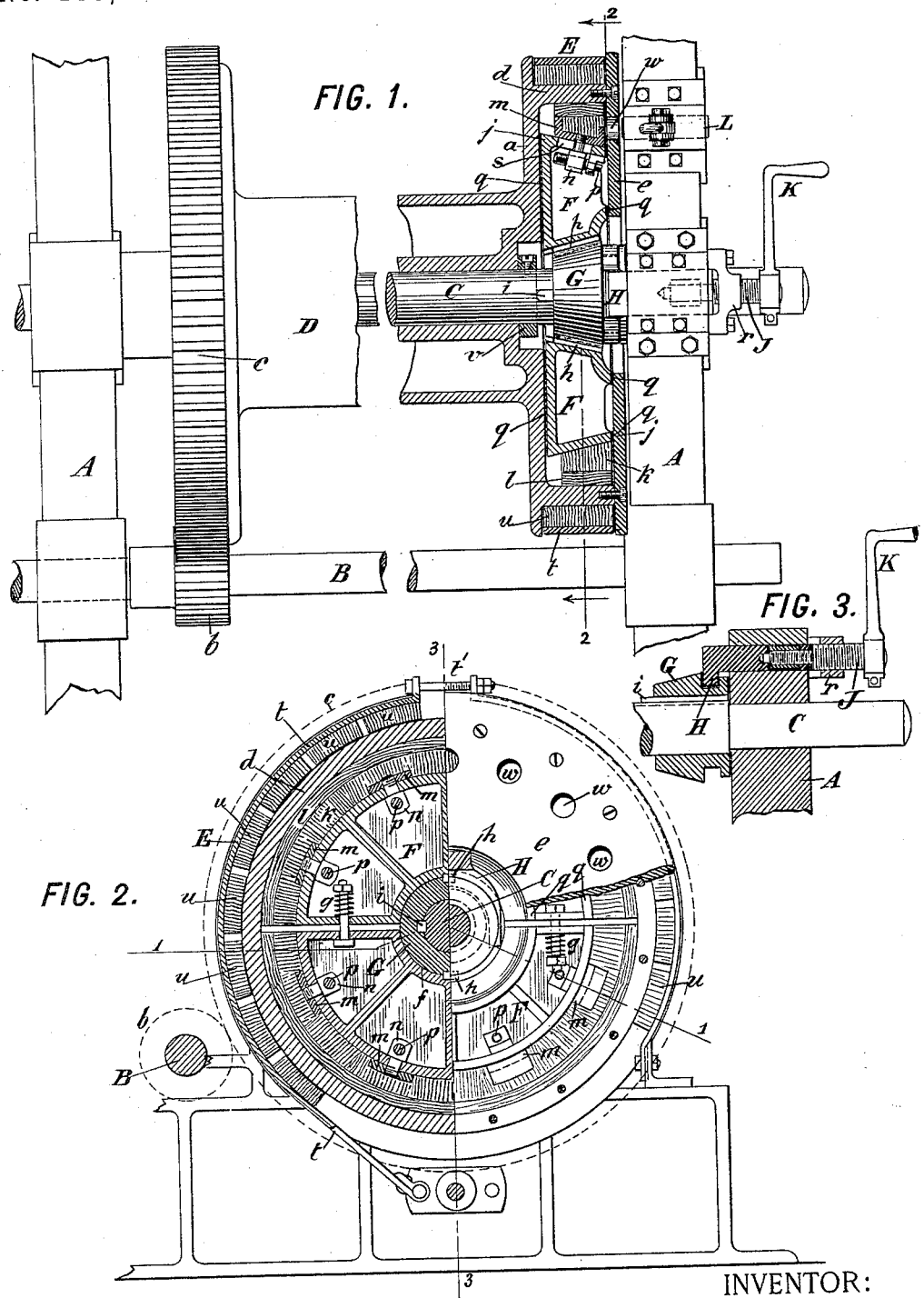

OTTO FLOHR, OF BUFFALO, NEW YORK, ASSIGNOR TO CHARLES A. POOLEY, OF SAME PLACE.

FRICTION-CLUTCH.

SPECIFICATION forming part of Letters Patent No. 445,247, dated January 27, 1891.

Application filed October 18, 1890. Serial No. 368,560. (No model.)

*To all whom it may concern:*

Be it known that I, OTTO FLOHR, a citizen of the United States, residing in Buffalo, in the county of Erie and State of New York, have invented certain new and useful Improvements in Friction-Clutches, of which the following is a specification.

This invention relates to friction-clutches for coupling together two rotative parts, the one a driving and the other a driven part. It is applicable to connecting a shaft to a drum or wheel or to another shaft, as well as to other possible applications.

The accompanying drawings illustrate my invention as applied to the winding-drum of a hoisting-engine.

Figure 1 is a plan view of the drum and driving-shaft and a fragment of the frame, the end of the drum to which my improved clutch is applied being shown in horizontal section cut in the line 1 1 in Fig. 2. Fig. 2 is a vertical transverse section on the line 2 2 in Fig. 1, the right-hand half showing the clutch in elevation and the left-hand half in mid-section. Fig. 3 is a fragmentary vertical section in the plane of the line 3 3 in Fig. 2.

Let A A represent the side frames of a hoisting-engine, B the driving-shaft thereof, C the drum-shaft, and D the drum. The driving-shaft B carries a pinion $b$, communicating motion to a gear $c$, fixed on the drum-shaft C. This is a usual arrangement. One end of the drum D is formed with a flange $d$, cylindrical on its inner and outer surfaces. It projects outwardly from one of the end plates $a$ of the drum, and against its outer face is fastened a plate or disk $e$. Between the plates $a$ and $e$ and within the flange $d$ is a space or chamber in which the movable parts of the clutch are inclosed. The plates $a$ and $e$ project outwardly beyond the flange $d$, so as to form a groove or channel in which is engaged a brake E.

My improved clutch consists, generally, of a divided disk F, having a frictional outer surface, which bears against the inner face of the flange $d$, and an expanding cone or wedge G, which slides on the shaft C and engages a central opening $f$ in the disk, so that by being thrust thereinto it expands the disk to cause its outer portion to frictionally engage the flange. The disk F is shown as made in two parts or halves, which are drawn together by springs applied to bolts $g$ $g$. The central opening $f$ is conical or tapering and fits the exterior of the cone G.

To form a driving connection the cone G is connected to two halves of the disk by splines $h$ $h$, on which it may slide as it is thrust in or retracted. The cone is connected to the shaft C by a spline $i$. The outer face of the disk F is formed as a conical rim $j$, against the outer side of which is confined a ring $k$, of suitable elastic wood or other material, which is faced with a ring $l$, of some suitable dense wood or other material adapted to constitute a frictional surface for engaging the inner face of the flange $d$. The wooden rings $k$ $l$ are made in halves, each half being fastened to the conical periphery of the corresponding half-section of the disk F. The means for fastening them to the rim $j$ consists of chairs $m$ $m$, of metal, sunk into the wooden rings at intervals, and having flanges embracing their front and rear sides, as shown in Fig. 1, and fastened to the rim $j$ by headed bolts $n$ $n$ screwed into them, their shanks passing through longitudinal slots $s$ $s$ in the rim $j$. The rings are thus firmly held in contact with this rim. When first constructed the rings $k$ $l$, which are narrower than the space or chamber between the plates $a$ $e$, are fastened against the smaller side of the rim $j$, as shown in Fig. 1. As wear occurs, the rings $k$ $l$ are gradually adjusted outwardly to compensate therefor by moving them toward the left in Fig. 1, so that they mount continually on a larger portion of the conical rim. This adjustment is effected by screws $p$ $p$, which engage the heads of the fastening-bolts $n$ $n$, so that as they are turned they thrust these heads inwardly. To effect this adjustment the plate $e$ is removed, or holes or openings may be formed through it through which to insert a wrench or key.

The disk F is made wide enough to completely but loosely fill the space between the plates $a$ $e$, and to reduce its friction thereagainst it is faced on opposite sides with facings of copper or other suitable metal, (lettered $q\ q$ in Fig. 1.) These facings take up the wear against the plates $a\ e$, which are finished smooth on their interior surfaces, and both of which are made of hard metal, the wear of which in contact with the soft-copper facing is reduced to the minimum.

The cone G is moved out or in by a slide H, operated by a screw J, which is turned by an operating-crank K. The slide H works through a hole in the frame and has bifurcated arms engaging a groove in the outer end of the cone, as usual. The screw J reacts against a frame $r$, being either a compound screw or a right and left screw, or other suitable construction. By turning the crank K the cone G is thrust in or drawn back, so that the disk is expanded or contracted and caused to frictionally bind against or release the surface of the flange $d$. Thus by forcing the cone in the drum is clutched to the shaft C, and by retracting it the drum is released and permitted to turn loosely on the shaft.

The friction-brake E consists of an iron strap $t$, extending around the flange $d$ of the drum and faced with blocks or brake-shoes $u\ u$, of wood or other material, which come against the outer surface of this flange. The length of the strap $t$ is adjustable by one or more bolts $t'$ interposed between opposite halves of the strap. The endwise displacement of the drum on the shaft is prevented by a collar $v$, fixed to the shaft.

When it is desired to lock the drum fast in any position independently of the friction-clutch, this may be done by means of a sliding bolt L, mounted in the frame, and the end of which when thrust outwardly may enter any one of a succession of holes $w$ formed in the plate $e$.

It must not be inferred from the minuteness of detail with which I have described the preferred construction of my improved clutch as it is shown in the drawings that my invention is necessarily limited to the exact details set forth. It is susceptible of being modified in many ways without departing from its essential features. Thus in the construction of the disk F it may be made in any other convenient number of sections instead of two. Other means may be provided for imparting motion to the cone or other wedge G. Only one facing-ring of wood or other material may be used instead of the compound ring $k\ l$. Other means for adjusting this ring to take up wear may be provided in lieu of the conical rim $j$ and adjusting-screws $p\ p$. The ring may be fastened by other means than the chairs $m\ m$ and bolts $n\ n$. That part of my invention pertaining to the adjustable facing-ring exterior to the disk F may be omitted and this disk constructed to extend out to and bear directly against the flange $d$, as has heretofore been commonly done. Any other driving connection may be introduced to connect the disk F to the shaft C than the utilization of the cone G as such driving connection, other driving-connections being already known in the art.

Those features of construction which I consider essential to my invention are separately defined in the claims forming part of this specification.

I claim as my invention the following-defined novel features, substantially as hereinbefore specified, namely:

1. The combination, to form a friction-clutch, of a shaft, a cone sliding thereon and applied thereto, a sectional or divided disk the inner portion of which has an opening entered by said cone and splined thereto, whereby the cone forms a driving connection between the shaft and disk, and a part to be clutched to said shaft, having a flange inclosing said disk and against which its outer portion bears frictionally when expanded.

2. The combination, to form a friction-clutch, of a shaft, a sectional or divided disk and means for expanding it, said disk connected to and revolving with the shaft, a sectional ring of frictional material, the sections of which are fastened against the periphery of the sections of said disk, means for adjusting the sections of said ring outwardly relatively to said disk to compensate for their wear, and a part to be clutched to said shaft, having a flange inclosing said disk and against which the periphery of its frictional ring bears when it is expanded.

3. The combination of a shaft, a sectional or divided disk connected thereto so as to rotate therewith and having means for expanding it, said disk formed with a conical outer surface, a sectional ring having a conical inner surface fastened against the outer surface of the disk by an adjustable fastening, whereby as it wears it may be adjusted outwardly over said conical surface, and a part to be clutched to said shaft, having a flange inclosing said disk and ring.

4. The combination of a shaft, a sectional disk connected thereto so as to rotate therewith and having means for expanding it, said disk formed with an outer conical rim, a sectional ring of frictional material having a conical inner surface applied against the exterior of said rim, and fastenings therefor, consisting of headed bolts passing through slots in said rim, whereby the ring may be adjusted outwardly by moving the bolts in said slots, and a part to be clutched to said shaft, having a flange inclosing said disk and ring.

5. The combination of a shaft, a sectional disk connected thereto having a conical outer rim formed with longitudinal slots, a sectional friction-ring applied around the exterior of said disk and fastened thereto by bolts passing through said slots, means for adjusting said ring outwardly to take up wear, consisting of screws engaging said bolts for moving them outwardly in said slots, and a part to be clutched to said shaft, having a flange inclosing said disk and ring.

6. The combination of a shaft, a sectional disk having a conical outer rim formed with longitudinal slots, a sectional friction-ring applied around said rim, a fastening therefor consisting of chairs $m$ $m$, fixed to the ring at intervals, and bolts $n$ $n$, fixed to said chairs and passing through the slots in said rim, and a part to be clutched to said shaft, having a flange inclosing said disk and ring.

In witness whereof I have hereunto signed my name in the presence of two subscribing witnesses.

OTTO FLOHR.

Witnesses:
FRANK WILLSON,
AUGUST BECKER.